June 14, 1932.                H. G. MATTHEWS                1,862,577
                              OPTICAL PROJECTION
                              Filed Aug. 30, 1926          3 Sheets-Sheet 3
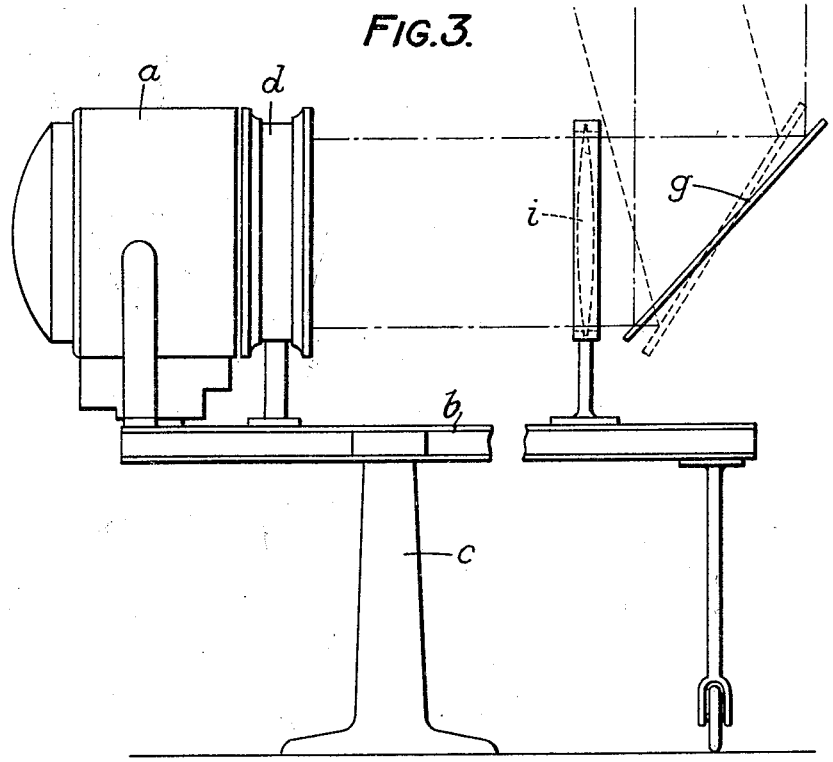
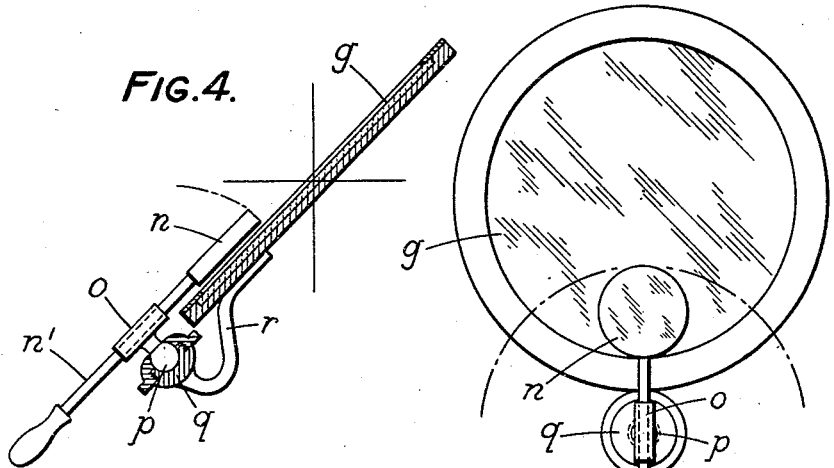
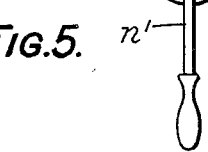
INVENTOR:
Harry Grindell Matthews
BY: Reeve, Boyer & Bakelar
ATTORNEYS.

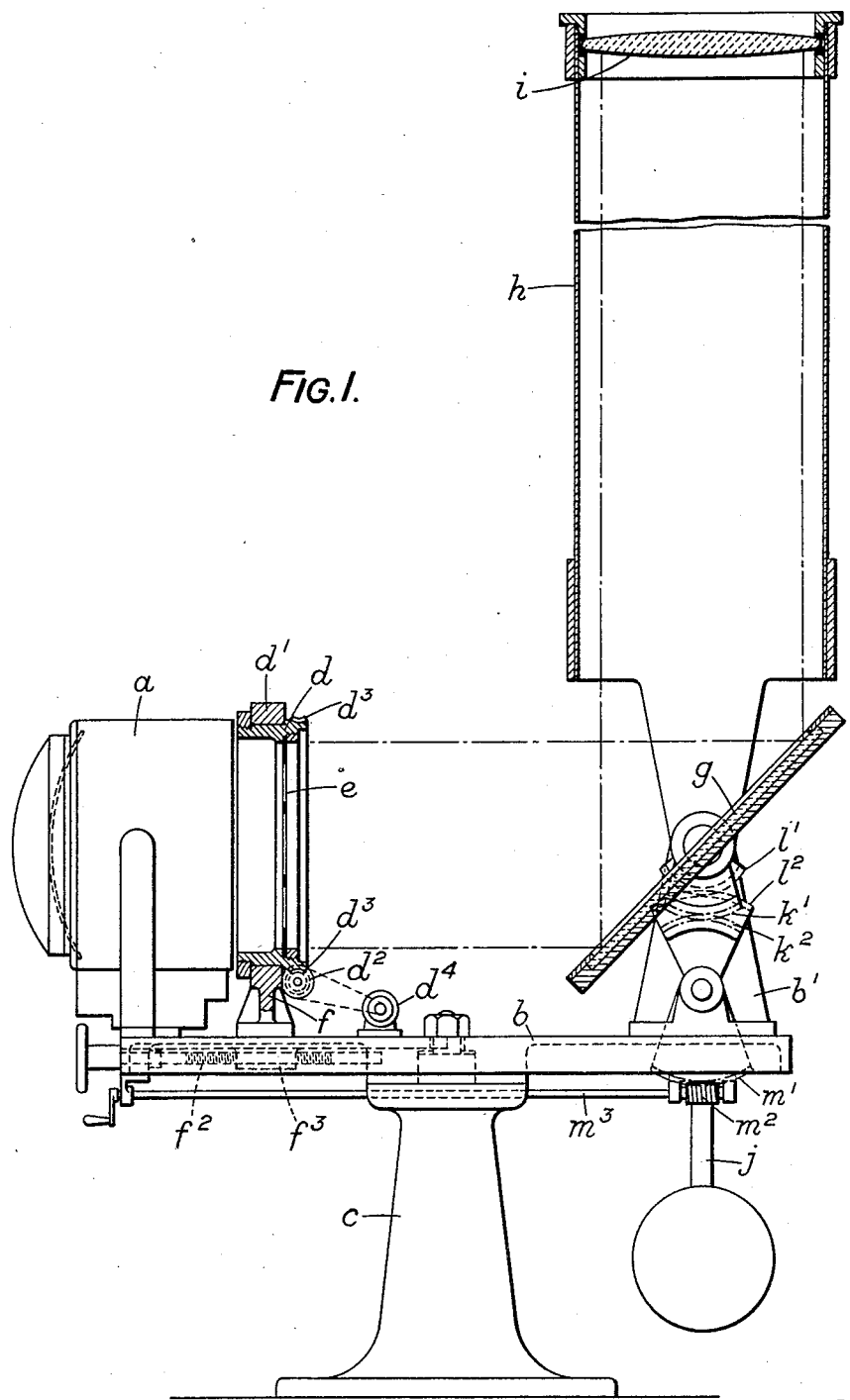

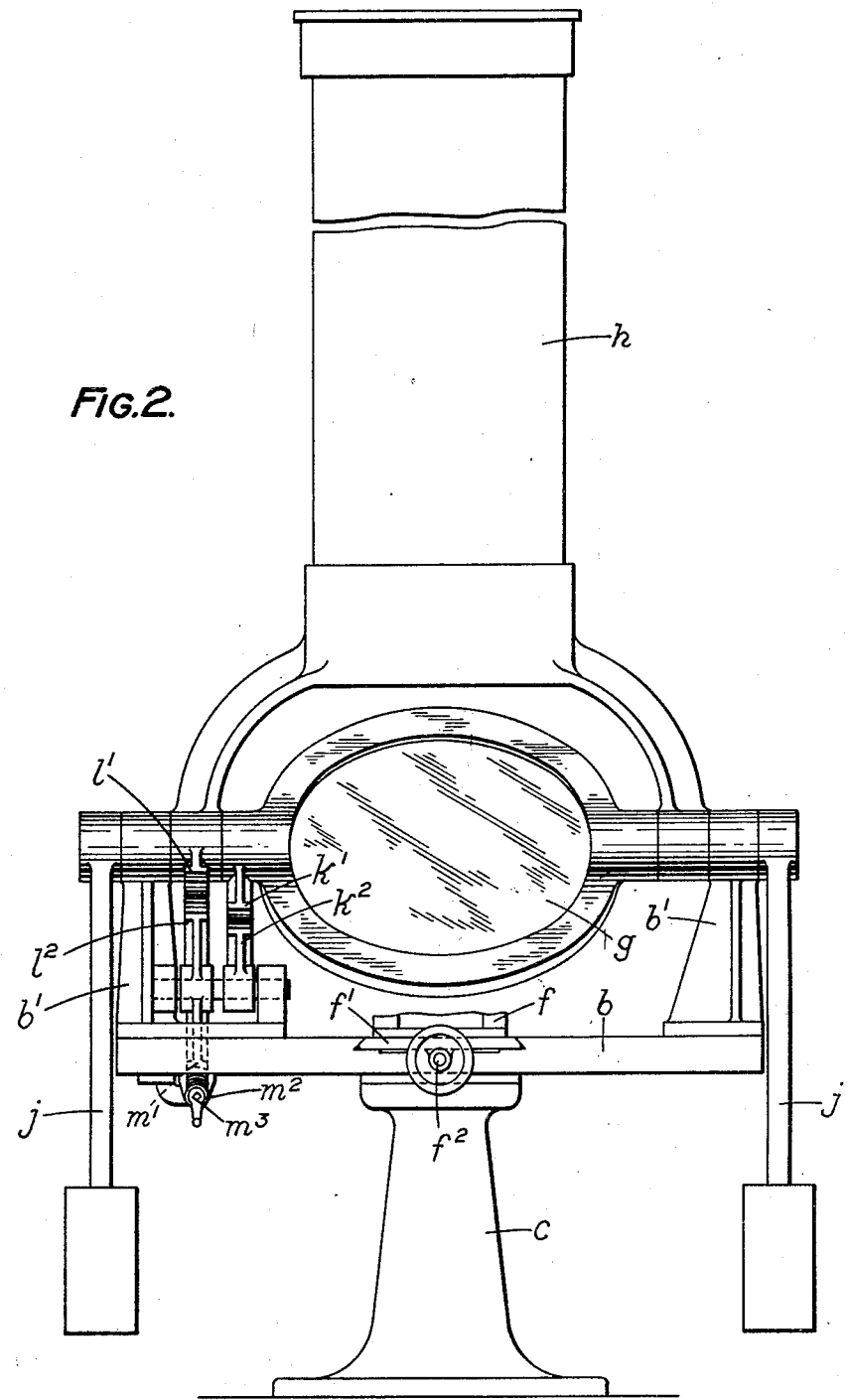

Patented June 14, 1932

1,862,577

UNITED STATES PATENT OFFICE

HARRY GRINDELL MATTHEWS, OF LONDON, ENGLAND, ASSIGNOR TO SKY PROJECTOR CORPORATION, OF NEW YORK, N. Y., A CORPORATION OF NEW YORK

OPTICAL PROJECTION

Application filed August 30, 1926, Serial No. 132,478, and in Great Britain March 17, 1926.

This invention relates to optical projection into the sky for advertising and other purposes.

I have discovered that with a suitable optical system a beam of light modified by traversing a stencil or other screen embodying an announcement or design, and projected into the sky, will give in the sky a clearly visible image without requiring any material background or surface upon which the image impinges. The clearer the night the brighter and more sharply defined is the image produced, consequently whatever the explanation of the phenomenon may be, it is not due to impingement of the beam upon a cloud.

More particularly the invention relates to the method of and means for obtaining a visible image in the sky in the above manner.

According to the invention, a substantially parallel beam of light from a searchlight projector is directed through a stencil or transparency, bearing a design or announcement, and then through a converging lens or objective of long focal length situated at such distance in front of the stencil or transparency as to produce a real image thereof at a distance. This real image when projected into and formed high in the sky is clearly visible.

An apparatus according to the invention therefore consists in the combination of a searchlight projector, a stencil or transparency illuminated by the projector, a lens or objective of long focal length arranged to give a remote real image of the stencil or transparency, and means for directing such image so as to be formed high in the sky.

A suitable height at which the image can be formed so as to be visible without an impingement surface is 600 metres and upwards. A suitable focal length for producing the distant image is 5 metres, and conveniently the diameter of the lens is approximately the same as the diameter of the parabolic mirror and mouth of the searchlight projector.

The beam has to be projected upwards, either vertically or obliquely. If this is effected by directing the projector upwards the use of a lens of long focal length would involve the upwardly directed length of the apparatus being unwieldy. Also the parabolic mirror of the projector is liable to become injured by hot material dropping thereon from the carbons of the electric arc thereof. For these reasons, and also to relieve the stencil or transparency from the heat ascending from the arc, the projector is arranged to project its beam substantially horizontally, and such substantially horizontal beam is directed upwards by means of an optically true plane mirror, either after or before traversing the lens.

The arrangement of the mirror beyond the lens requires merely variation of the inclination of the mirror to vary, within limits, the angle of upward projection of the beam, but this arrangement involves the entire system being unduly extensive horizontally. It is therefore preferred to mount the mirror between the stencil or transparency and the lens, and mount the lens at the upper end of a tube or support extending upwards above the mirror.

Representative apparatuses for optical projection into the sky are illustrated by way of example on the accompanying drawings, in which:—

Fig. 1 is a sectional side elevation and Fig. 2 an end elevation with the projector and stencil carrier removed, showing one form of construction.

Fig. 3 is a side elevation showing another form of construction.

Figs. 4 and 5 are respectively a sectional side elevation and a front elevation of a mirror showing an additional detail, on a slightly larger scale.

Referring more particularly to Figs. 1 and 2: $a$ is a searchlight projector mounted on and arranged to direct a beam of light horizontally across a horizontal platform $b$, swivelling on the head of a pedestal base $c$.

$d$ is a carrier for a stencil or transparency $e$, mounted in front of the projector $a$ on a base $f$ sliding, by means of a bevel-edged slide $f^1$, in an undercut slideway formed in the platform $b$. $f^2$ is a hand wheel screw spindle, journalled in the platform $b$ and engaged by a screw-threaded socket $f^3$ on the slide $f^1$, whereby the stencil carrier $d$ can be displaced axially in front of the projector $a$.

Opposite the projector $a$ and supported by upstanding brackets $b^1$ on the platform $b$, is an optically true plane mirror $g$.

Above the mirror $g$, a tube $h$ is also supported by the brackets $b^1$. An objective lens $i$ is mounted in the free end of the tube $h$, and the tube $h$ and lens $i$ are counterbalanced by weighted lever arms $j$ fast with the tube $h$.

Fast with the mirror $g$ is a toothed sector $k^1$, and fast with the tube $h$ is another, but smaller, toothed sector $l^1$. The sector $k^1$ gears with a sector $k^2$ and the sector $l^1$ gears with a sector $l^2$, both fast with a worm wheel sector $m^1$ with which gears a worm $m^2$ on a hand crank spindle $m^3$ journalled beneath the platform $b$.

The ratios of the sectors $k^1$, $k^2$ and $l^1$, $l^2$ is such that when the handwheel spindle $m^3$ and worm gear $m^2$, $m^1$ are turned, the tube $h$ makes double the angular movement of the mirror $g$.

The above described parts of the apparatus are so relatively arranged that a beam of light from the projector $a$ after passing through the stencil $e$ is by a mirror $g$ directed along the tube $h$ through the lens $i$, and the relative situations of the stencil $e$ and lens $i$ are such that an image of the stencil $e$ is thereby formed in the sky.

The direction of projection of the beam can be varied within limits by varying the inclination of the mirror $g$ and tube $h$, by means of the hand crank spindle $m^3$.

Focusing of the beam and image is effected by displacing the stencil carrier $d$ by means of the hand wheel spindle $f^2$.

In the alternative arrangement illustrated diagrammatically in Fig. 3, the lens $i$ is supported on the platform $b$, between the stencil carrier $d$ and the plane mirror $g$. The tube $h$ therefore is dispensed with, but the apparatus becomes very extensive in the horizontal direction.

To enable any announcement projected into the sky to be presented correctly for being read by observers viewing such announcement from all directions, the stencil or transparency $e$ may be arranged slowly to rotate in its own plane relatively to the projector $a$, thus giving a slowly rotating image in the sky. This can be effected as shown in Fig. 1 by mounting the stencil carrier $d$ in an annular bearing $d^1$ and rotating the stencil carrier $d$ by a worm $d^2$, gearing with a worm wheel $d^3$ formed on the periphery of the stencil carrier $d$, and driven by an electric motor $d^4$.

To give a progressively changing announcement, a chain or band of stencils or transparencies may be caused to pass across the gate of the stencil carrier $d$, the band being for instance unwound off one drum and wound on to another after the manner of an ordinary moving picture machine.

Movable effects of the projected image may be obtained by slightly deflecting portions of the projected beam of light after traversing the stencil or transparency $e$. The effect of such slight deflection of a portion of the beam, is to cause the image of the portion of the stencil or transparency illuminated thereby to diverge in the sky from the normally projected portions of the image. Thus attractive effects can be produced in the sky by the so-produced divergence and separation of one portion of the image from another followed by the approach and coalescence of the separated portions of the image.

As examples may be mentioned images of symmetrically or unsymmetrically opening and closing petals of a flower, the recession and approach of a letter of an announcement, or the like.

Any suitable optical contrivance for diverting light may be employed for the above purpose. For example as shown in Fig. 4 and 5, a mirror $n$ can be interposed between the stencil or transparency $e$ and the surface of the main plane reflecting mirror $g$, even when, as is most convenient, the mirror $g$, is interposed between the stencil or transparency $e$ and the lens $i$ as in the construction illustrated in Figs. 1 and 2. The interposed mirror $n$ is shown secured on the end of a handled stem $n^1$ sliding in a sleeve $o$ fast on the bell element $p$ of a ball and socket joint, the socket element $q$ of which is formed on a bracket $r$ secured to the frame of the mirrow $g$. Thus by means of the handle the mirror $n$ can be interposed over the mirror $g$ and its inclination varied to deflect the respective portion of the beam of light which it intercepts.

I claim:

1. In apparatus for effecting optical projection into the sky, a searchlight projector arranged to project its beam substantially horizontally, a transparency illuminated by said projector, an optically true plane mirror directing upwards said beam from said projector, above said mirror an objective of long focal length so located relatively to said transparency as to give a remote real image thereof, and means for moving said mirror and objective in the same direction at different speeds thereby to vary their relative angular positions.

2. In apparatus for effecting optical projection into the sky, a searchlight projector arranged to project its beam substantially horizontally, a transparency illuminated by said projector, an objective so located relative to said transparency as to give a remote real image thereof, an optically true plane mirror disposed in position to direct the beam from said projector toward said objective, and means interposed between said transparency and said mirror for intercepting a portion of said beam before it reaches the mirror and deflecting it from the path of that portion of the beam which strikes the surface of the mirror.

3. In apparatus for effecting optical projection into sky, a searchlight projector, a transparency illuminated by said projector, an objective of long focal length so located relatively to said transparency as to give a remote real image thereof, an optically true plane mirror directing upwards the beam from said projector, a second mirror of smaller size than said plane mirror movably disposed in position to deflect a portion of said beam before it reaches the plane mirror, and means for varying the angular position of said small mirror with relation to the plane mirror.

4. An apparatus of the character described, comprising a searchlight projector disposed to project its beam substantially horizontally, an optically true plane mirror disposed in the path of said beam at an angle thereto, means for supporting a transparency in the path of said beam intermediate said projector and mirror, means for supporting an objective of long focal length above said mirror in position to produce a remote real image of said transparency, said mirror and lens-carrying-means being mounted for pivotal movement, and means for simultaneously swinging the mirror and lens-carrying-means on their pivot in the same direction at different speeds thereby to vary their relative angular positions.

In testimony whereof I have signed my name to this specification.

HARRY GRINDELL MATTHEWS.